Patented Feb. 1, 1938

2,107,065

UNITED STATES PATENT OFFICE 2,107,065

PROCESS AND PRODUCTS RELATING TO RECOVERY OF ALCOHOLS FROM HYDROCARBON POLYMERS

Adrianus Johannes van Peski, Amsterdam, Netherlands, assignor to Shell Development Company, San Francisco, Calif., a corporation of Delaware No Drawing. Application June 20, 1936, Serial No. 86,350. In the Netherlands July 4, 1935

16 Claims. (Cl. 260—99.11)

This invention relates to a practical and economical process for the recovery of the alcohol content of the polymer phase formed in olefine hydration processes and it also provides a process for the recovery of the alcohol content as well as the alkyl ester content of polymer mixtures, or hydrocarbon mixtures comprising polymers, formed in the production of alkyl esters of polybasic mineral oxy-acids, either by olefine absorption in such an acid or by the reaction of an alcohol with the desired acid.

In accordance with the process of the invention, the polymer phase, which may contain one or a plurality of alcohols dissolved therein is treated with a metal hydroxide and carbon bisulphide under such conditions that reaction occurs to convert the alcohol or alcohols dissolved in the treated hydrocarbon mixture to the corresponding metal xanthate or mixture of metal xanthates, which commercially attractive products are separated from the treated mixture, thus leaving the polymer mixture in a substantially alcohol-free condition. It is seen that the process provides means for recovering the alcohol content of the polymer by-products formed in olefine hydration or alkyl ester production operations as valuable products while, at the same time, making the polymer or polymers available for purposes where a substantially alcohol-free mixture of higher unsaturated hydrocarbons is desired.

The invention further relates to certain new and useful compositions of matter, particularly mixtures of the metal xanthates of the higher aliphatic alcohols such as those containing five or more carbon atoms to the molecule, said novel compositions being obtained by recovering the alcohol content, as herein described, of polymer mixtures resulting as by-products in the hydration of mixtures of the higher olefines or hydrocarbon mixtures containing such higher olefines.

The invention is broadly applicable to the recovery of the alcohol content of the polymer by-products or hydrocarbon mixture comprising such polymer by-products formed in the hydration of olefines to alcohols and/or ethers. Such polymer by-products may be formed in the liquid, vapor or liquid-vapor phase hydration of olefines. For example, they are formed when olefines are hydrated in the vapor phase by reaction with steam in the presence of various contact catalysts as solid metal salts, solid acids as phosphoric acid mixed with a siliceous material, etc. Such polymers may be formed in the liquid-vapor phase hydration of olefines as when an olefine and water are contacted with a catalyst as an acid, acid salt, etc. at elevated temperatures. The polymers may be formed in the liquid phase hydration of olefines in the presence of hydration catalysts at elevated temperatures and superatmospheric pressures. Such polymer mixtures are also obtained in the production of alcohols, ethers and alkyl esters by absorbing an olefine or a mixture of olefines in a polybasic mineral oxy-acid such as sulphuric acid, pyrosulphuric acid, phosphoric acid, benzene sulphonic acid, etc. Such a polymer phase may also be formed in the production of the corresponding alkyl esters of alcohols by reacting said alcohol or alcohols with a selected mineral oxy-acid.

The term "polymer phase" as used herein and in the appended claims means the polymers per se or the hydrocarbon mixture comprising such polymers. Thus, it is seen that in some cases the polymer phase may comprise substantially only the inter-polymers and co-polymers, as the dimers, trimers, and higher polymers of the olefine or olefines involved in the respective absorption or hydration reaction, while in other cases the polymer phase may comprise, in addition to the olefine polymers, unreacted olefines and saturated hydrocarbons originally present in the base material treated, as when an alkane-alkene fraction is treated for hydration of or absorption of its olefine content.

When such a polymer phase is present, as is usually the case in most olefine hydration or absorption processes, even when they are conducted under the most carefully controlled conditions, a relatively large amount of the alcohol or alcohols produced is dissolved in the polymer phase and lost because heretofore there has been no technically feasible method for recovering the alcohol content of such mixtures. This loss of alcohol materially decreases the commercial attractiveness of olefine hydration processes, particularly those processes involving olefine absorption in a polybasic mineral oxy-acid, for several reasons: All of the alcohol prepared is not recovered, alkyl esters which will yield alcohols on hydrolysis are also present in the polymer phase and lost because even if they are hydrolyzed in said polymer phase the alcohols cannot be recovered therefrom, and the polymer by-product obtained is practically useless for many purposes because of its alcohol content.

The problem of recovering the alcohols from the polymer phase is present even in the production of the lower alcohols, but the efficiency of the alcohol recovery in such hydration processes decreases as the molecular weight of the prepared alcohol increases. The solubility of the alcohols in water decreases as their molecular weight increases, while, on the other hand, they become more soluble in the hydrocarbon or polymer phase with increasing molecular weight. In addition, as the molecular weight of the absorbed olefines increases the molecular weight of the polymers as well as the saturated hydrocarbons comprising the polymer phase increases and said polymer phase is capable of dissolving greater amounts of alcohols.

Recovery of the alcohol content of hydrocarbon mixtures in a practical and economical manner by the conventional methods is a difficult and prohibitively costly procedure. The most obvious method, that is, distillation, is generally unsuitable for several reasons: The separation of relatively small amounts of alcohol from a relatively large amount of polymer phase is difficult; some of the constituents of the polymer phase and the alcohols may have substantially the same boiling temperatures making efficient separation difficult; some of the constituents of the polymer phase may form constant boiling mixtures with the alcohols and prevent complete separation. With the hydrocarbons containing the lower alcohols, some success may be achieved in recovering the alcohols by extraction with water. However, the recovery of the higher alcohols from the polymer phase by extraction is highly impractical and ineffective due to the fact that said higher alcohols are more soluble in the polymer phase than in water.

When the invention is executed to recover the alcohol content of the polymer phase formed during the absorption of olefines in polybasic mineral oxy-acids and the subsequent treatment of the acid-liquor, said alcohols are substantially completely recovered as metal xanthates which are commercially attractive by-products which are insoluble in and readily separated from said polymer phase, and, in addition the polymer by-product is obtained substantially free of alcohols. As such, the polymer product is useful for purposes to which the alcohol-containing polymer is unsuitable. For example, the alcohol-free polymer may be rapidly and substantially completely hydrogenated, in the presence of active metal catalysts at moderate temperatures and pressures, and converted to saturated hydrocarbon mixtures useful as anti-knock motor fuels and as components of fuel mixtures. When such polymer mixtures contain alcohols in any appreciable amount their efficient hydrogenation becomes less feasible. Under hydrogenation conditions, the alcohols are dehydrated and the water thus formed has a deleterious effect upon the life and activity of the active metal catalysts, particularly when liquid phase methods are employed.

The invention is by no means limited as regards the alcohol or alcohols which may be recovered in accordance therewith. Aliphatic alcohols which may be recovered include among others the following: ethyl, propyl, isopropyl, butyl, secondary butyl, isobutyl, tertiary butyl, the primary normal and isoamyl alcohols, the secondary amyl alcohols, the primary and secondary hexyl alcohols, the heptyl alcohols, the octyl alcohols, the nonyl alcohols, and the like and their homologues and suitable substitution products. Polyhydric alcohols as the ethylene, propylene, butylene, amylene glycols and their homologues as well as the polyglycols, glycerols, etc., may be recovered. In addition to saturated alcohols, the process of the invention may be applied to the recovery of unsaturated alcohols as allyl alcohol, crotyl alcohol, isobutenol, secondary pentenol, the hexenols, the heptenols, etc., citronellol, geraniol, propargyl alcohol, cinnamyl alcohol, and the like. Suitable cyclic alcohols include among others the following: benzyl alcohol, phenyl propyl alcohol, cyclopentanol, cyclohexanol, furfuryl alcohol and the like.

The process of the invention is particularly well adapted to the recovery of aliphatic alcohols containing at least five carbon atoms to the molecule as the amyl, hexyl, heptyl, octyl, nonyl, etc., alcohols, severally or in combination, from hydrocarbon mixtures as xanthates, particularly from polymer mixtures formed in the absorption of the corresponding olefines in polybasic strong acids, and during the working-up of the acid absorption liquors. The mixtures of higher metal xanthates are particularly valuable compositions of matter which are in demand for commercial use as vulcanizing accelerators, insecticides, etc., and as flotation promoters.

The composition and nature of the hydrocarbon mixtures from which alcohols are recovered in accordance with the invention are immaterial. Alcohol-containing hydrocarbon mixtures which are normally liquid at about room temperature are preferably treated. The process is particularly adapted to the recovery of alcohols from mixtures comprising or consisting of the higher olefine polymers.

In the execution of the invention any suitable metal hydroxide which is capable of reacting with carbon bisulphide and the alcohol or alcohols present in the treated mixture may be used. A preferred group of hydroxides includes the alkali metal and alkaline earth metal hydroxides and ammonium hydroxide, which for the purpose of the present invention acts as an alkali metal hydroxide. In general, the invention is executed with sodium hydroxide or potassium hydroxide, and the corresponding sodium or potassium xanthates are obtained by reaction with carbon bisulphide and the alcohol content of the hydrocarbon mixture. The metal hydroxide may be added to the hydrocarbon mixture in any suitable manner, for example, as a powder, or if desired, dissolved or suspended in water or suspended in some other suitable inert medium.

The invention may be executed in any suitable apparatus. It is preferably executed in a vessel of appropriate size provided with heating and cooling means, means for agitating its contents as by mechanical stirring, means for removal of the solid xanthates, and preferably provided with a reflux condenser for preventing loss of carbon bisulphide and other volatile substances, such as solvents for the carbon bisulphide, by volatilization due to heat liberated in the course of the reaction.

The carbon bisulphide may be added to the reaction mixture alone or dissolved in or mixed with a suitable relatively inert material as a paraffin hydrocarbon, benzine, chlorinated hydrocarbon, etc. The order of introduction of the metal hydroxide and carbon bisulphide is immaterial. Preferably, I first add the required amount or an excess of the metal hydroxide and then add the carbon bisulphide slowly, preferably below the surface of the reaction mixture, while stirring. In this manner, control of the temperature of reaction may be facilitated. Cooling of the reaction mixture may also be resorted to when necessary or desirable. To facilitate substantially complete recovery of the alcohols, the metal hydroxide and the carbon bisulphide are preferably employed in an amount sufficient to react with all of the alcohols present in the treated hydrocarbon mixture. It may, in some cases, be desirable to employ a substantial excess of both or of one of the added reactants. By employing a substantial excess of carbon bisulphide, control of the reaction temperature may be aided by the vaporization of said excess, which excess may be recovered and reutilized when the reaction is completed.

Instead of employing an excess of carbon bisulphide to control or aid in the control of the exothermic reaction, there can be used an inert fluid whose boiling temperature is favorable such as gasoline, benzine, benzol, carbon tetrachloride, paraffin hydrocarbons as propane, butane, pentane, etc., and the like. Such materials may be added in such cases where they are not already in the hydrocarbon mixture treated.

The recovered metal xanthates or mixtures thereof may or may not contain water of crystallization depending upon the alcohols recovered, upon whether or not water was present in appreciable amount in the hydrocarbon mixture treated, upon whether water was introduced during the treatment, for example, with the metal hydroxide or the carbon bisulphide, etc. If it is desired to obtain a dry xanthate or xanthate mixture, the water may be driven off by suitable treatment with heat or with a current of warm air passed over or through the material.

The treated hydrocarbon mixture, particularly when it is a polymer phase formed as a by-product in the production of alcohols, ethers, alkyl esters, etc., by the absorption of olefines in polybasic mineral or mineral acting acids as sulphuric acid, pyrosulphuric acid, phosphoric acid, benzene sulphonic acid, etc., may contain, in addition to one or more alcohols, one or more alkyl esters of the polybasic acid used in the absorption. If desired, such mixtures may be treated as herein described for the recovery of the alcohol content without first subjecting the hydrocarbon mixture to a treatment to convert said alkyl esters contained therein to alcohols.

Preferably, when the polymer phase contains substantial amounts of such alkyl esters, it is subjected, prior to the alcohol recovery step, to a hydrolytic treatment with water to convert said alkyl esters to the corresponding aliphatic alcohols, which may then be recovered along with the alcohols originally present. The hydrolysis of the alkyl esters is preferably effected by treating the mixture with a dilute aqueous acid solution and then distilling.

It is seen that the invention provides a practical and economical process for the recovery of the alkyl ester content of hydrocarbon mixtures. The hydrocarbon mixture containing the alkyl ester or esters is treated to hydrolyze the ester content thereof to the corresponding alcohols, which alcohols are recovered from the hydrocarbon mixture as xanthates. For example, the alkyl halide content of a hydrocarbon mixture can be recovered by subjecting the mixture to a hydrolysis treatment with a basic metal compound, and recovering the alcohols or alcohols resulting from the hydrolysis, either partially or completely, from the hydrocarbon mixture as the corresponding metal xanthates in accordance with the process of the invention.

The following example, which is introduced for the purposes of illustration and is not to be regarded as limiting the invention, describes a mode of executing the process of the invention.

Example

About 1500 grams of a hydrocarbon fraction having a boiling range of from about 50° C. to about 160° C. and obtained from a vapor phase cracking distillate was stirred for about 1 hour with about 1220 grams of 90% sulphuric acid at a temperature of about 20° C. to about 25° C.

At the end of this time the mixture was diluted by the addition thereto of about 400 grams of ice whereupon a lower layer of sulphuric acid solution having a concentration of about 60% $H_2SO_4$ separated; then, the mixture was further diluted by the addition of about 5200 grams of water. The lower or aqueous layer was then separated and worked up in the usual manner for the recovery of the alcohols therefrom.

The top layer (about 935 grams), which contained non-converted hydrocarbons, polymers, alcohols, dialkyl sulphates, etc., was then treated to recover the alcohols and alkyl sulphates therefrom as follows:

The 935 grams of the polymer phase were treated with about 700 c. c. of a 15% sulphuric acid solution at a temperature of about 90° C. to convert the alkyl sulphates to alcohols, and then subjected to a steam distillation. The substantially colorless top layer of the steam distillate was separated, washed three times with water, and dried with anhydrous calcium chloride. After this treatment, the weight of the polymer layer was about 490 grams. Analysis showed that the polymer layer contained about 1.1 gram moles of higher alcohols.

The polymer layer was then mixed with about 110 c. c. of washing benzine and about 74 grams of powdered KOH (84% KOH), and the mixture stirred and heated for about 1 hour. At the end of this time the mixture was cooled to about 5° C. and a mixture of about 89 grams of carbon bisulphide with about 100 c. c. of washing benzine was added, while stirring the mixture, at such a rate that by cooling with ice the temperature of the reaction mixture could be kept conveniently below about 10° C. After all of the carbon bisulphide-benzine mixture had been added, the stirring was continued for about 2.5 hours at about room temperature, after which the separated xanthate mixture was filtered off, washed with pentane and dried in vacuo.

The dry xanthate product weighed about 215 grams and was found to be about 92% xanthate calculated as a mixture of equal molecular quantities of secondary hexyl-, heptyl-, octyl- and nonyl-xanthates. This mixture of higher xanthates prepared in the manner above-described is a novel composition of matter useful for any purpose to which xanthates may be put, and particularly useful as a flotation promoter due to the high molecular weight of the constituent xanthates.

While I have described my invention in detail and illustrated specific embodiments of the same, it is to be understood that this is for the purpose of clearness of understanding and that no limitations other than those imposed by the terms of the appended claims are to be understood therefrom.

I claim as my invention:

1. In a process for the production of organic oxy-compounds by the treatment of olefines with water in the presence of a mineral acid-acting compound, the step of recovering the alcohol content of the polymer mixture formed during the treatment which comprises reacting the alcoholic content of the separated polymer phase with a metal hydroxide and carbon bisulphide to form a metal xanthate, and recovering the metal xanthate from the polymer phase.

2. In a process for the production of organic oxy-compounds by the treatment of olefines with water in the presence of a mineral acid-acting compound, the step of recovering the alcohol content of the polymer mixture formed during the treatment which comprises reacting the alcoholic content of the separated polymer phase with an alkali metal hydroxide and carbon bisulphide to form an alkali metal xanthate, and recovering the metal xanthate from the polymer phase.

3. In a process for the production of organic oxy-compounds by the absorption of olefines in a polybasis mineral oxy-acid, the step of recovering the alcohol content of the polymer mixture formed during the treatment which comprises reacting the alcoholic content of the separated polymer phase with an alkali metal hydroxide and carbon bisulphide to form an alkali metal xanthate, and recovering the metal xanthate from the polymer phase.

4. In a process for the production of organic oxy-compounds by the absorption of olefines in a concentrated sulphuric acid, the step of recovering the alcohol content of the polymer mixture formed during the treatment which comprises reacting the alcoholic content of the separated polymer phase with an alkali metal hydroxide and carbon bisulphide to form an alkali metal xanthate, and recovering the metal xanthate from the polymer phase.

5. In a process for the production of alcohols by the absorption of olefines in a polybasic mineral oxy-acid, the step of recovering the alcohol content of the polymer phase formed during the absorption and during hydrolysis of the absorption solution which comprises reacting the alcoholic content of the separated polymer phase with an alkali metal hydroxide and carbon bisulphide to form an alkali metal xanthate, and recovering the metal xanthate from the polymer phase.

6. In a process for the production of alcohols by the absorption of a mixture of olefines in a concentrated sulphuric acid, the step of recovering the alcohol content of the polymer phase formed during the absorption of the olefines and the hydrolysis of the absorption solution which comprises adding to the separated polymer phase an alkali metal hydroxide and carbon bisulphide in amounts sufficient to react with substantially all of the alcoholic content of the polymer phase to precipitate an alkali metal xanthate, and separating the metal xanthate from the polymer phase.

7. In a process for the production of alkyl esters of mineral oxy-acids by the treatment of compounds of the class consisting of olefines and alcohols with a mineral oxy-acid, the step of recovering the alcohol content of the polymer phase formed during the treatment which comprises reacting the alcoholic content of the separated polymer phase with an alkali metal hydroxide and carbon bisulphide to form a metal xanthate, and recovering the metal xanthate from the polymer phase.

8. In a process for the production of organic oxy-compounds by the absorption of olefines in a polybasic mineral oxy-acid, the step of recovering the alcohol content of the polymer mixture formed during the treatment which comprises subjecting the separated polymer phase to treatment with water at an elevated temperature to convert the polybasic mineral oxy-acid alkyl ester content thereof to an alcohol, separating the polymer phase from the hydrolysis mixture, reacting the alcoholic content of the separated polymer phase with an alkali metal hydroxide and carbon bisulphide to form an alkali metal xanthate, and recovering the metal xanthate from the polymer phase.

9. In a process for the production of alcohols by the absorption of a mixture of olefines in a concentrated sulphuric acid, the step of recovering the alcohol content of the polymer phase formed during the olefine absorption and hydrolysis of the absorption solution which comprises subjecting the separated polymer phase to treatment at an elevated temperature with a dilute aqueous solution of a mineral acid, separating the polymer phase from the hydrolysis mixture, reacting the alcoholic content of the separated polymer phase with an alkali metal hydroxide and carbon bisulphide to form an alkali metal xanthate, and recovering the metal xanthate from the polymer phase.

10. A process for the recovery of the alcohol content of polymer mixtures containing alcohols and mineral acid alkyl esters which comprises treating such a polymer mixture with water in the presence of a hydrolyzing agent to hydrolyze the mineral acid alkyl ester content thereof to an alcohol, separating the polymer phase from the hydrolysis mixture, reacting the alcoholic content of the separated polymer phase with an alkali metal hydroxide and carbon bisulphide to form an alkali metal xanthate, and recovering the metal xanthate from the polymer phase.

11. In a process for the production of a mixture of higher alcohols by absorbing a mixture of higher olefines in a polybasic mineral oxy-acid, the step of recovering the alcohol content of the polymers formed during the olefine absorption and hydrolysis of the absorption solution which comprises reacting the alcoholic content of the separated polymer phase with an alkali metal hydroxide and carbon bisulphide to form a mixture of alkali metal xanthates of the higher alcohols, and recovering the mixed metal xanthates from the polymer phase.

12. In a process for the production of a mixture of higher alcohols by absorbing a mixture of olefines containing at least five carbon atoms to the molecule in a concentrated sulphuric acid, the steps of recovering the alcohol content of the polymer mixture formed during the olefine absorption and the subsequent working up of the acid liquor which comprise separating the polymer phase, subjecting the separated polymer phase to a hydrolysis treatment to hydrolyze the alkyl sulphate content thereof to alcohols, separating the polymer phase from the hydrolysis mixture, reacting the alcoholic content of the separated polymer phase with an alkali metal hydroxide and carbon bisulphide to form a mixture of alkali metal xanthates containing at least five carbon atoms to the molecule.

13. In a process for the production of a mixture of alcohols by treating a hydrocarbon fraction boiling between about 50° C. and about 160° C. and containing a plurality of different higher olefines with a concentrated sulphuric acid for the absorption of the olefine content thereof, the step of recovering the alcohol content of the polymer phase formed during the treatment which comprises separating the polymer phase from the absorption solution, subjecting the separated polymer phase to treatment with an alkali metal hydroxide and carbon bisulphide to form a mixture of alkali metal xanthates, and separating the mixture of xanthates from the polymer phase.

14. A mixture of metal xanthates essentially consisting of a plurality of xanthates of secondary alcohols containing at least five carbon atoms to the molecule obtained by the xanthogenation of the alcohol content of the polymer phase formed in the treatment of a mixture of olefines containing at least five carbon atoms to the molecule with a mineral acid.

15. A mixture of metal xanthates essentially consisting of a plurality of alkali metal xanthates of secondary alcohols containing at least five carbon atoms to the molecule obtained by the xanthogenation of the alcohol content of the polymer phase formed in the production of alcohols by absorbing a plurality of olefines of different molecular weight and containing at least five carbon atoms to the molecule in a concentrated sulphuric acid and hydrolyzing the absorption solution.

16. A mixture of xanthates essentially consisting of a plurality of alkali metal xanthates of secondary alcohols containing from five to nine carbon atoms obtained by the xanthogenation of the alcohol content of the polymer phase formed in the production of alcohols by absorbing a mixture of olefines containing from five to nine carbon atoms in a concentrated sulphuric acid solution and hydrolyzing the absorption solution.

ADRIANUS JOHANNES VAN PESKI.